(12) United States Patent
Miyoshi et al.

(10) Patent No.: US 11,480,863 B2
(45) Date of Patent: Oct. 25, 2022

(54) PROJECTOR THAT LOWERS VISIBILITY OF BASE IMAGE, PROJECTION SYSTEM AND PROJECTION METHOD

(71) Applicant: SEIKO EPSON CORPORATION, Tokyo (JP)

(72) Inventors: Kazuhiro Miyoshi, Matsumoto (JP); Hirofumi Kasuga, Matsumoto (JP); Naoya Nishimura, Matsumoto (JP); Masanori Ojima, Kyoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/526,406

(22) Filed: Jul. 30, 2019

(65) Prior Publication Data

US 2020/0043154 A1 Feb. 6, 2020

(30) Foreign Application Priority Data

Jul. 31, 2018 (JP) .............................. JP2018-143932

(51) Int. Cl.
| | |
|---|---|
| *G03B 21/00* | (2006.01) |
| *H04N 9/31* | (2006.01) |
| *G03B 21/26* | (2006.01) |
| *G06T 5/50* | (2006.01) |
| *G09F 19/18* | (2006.01) |

(52) U.S. Cl.
CPC .............. *G03B 21/26* (2013.01); *G03B 21/00* (2013.01); *G06T 5/50* (2013.01); *H04N 9/3179* (2013.01); *G09F 19/18* (2013.01)

(58) Field of Classification Search
CPC ........... G03B 21/00; G06T 5/50; G09F 19/18; G09F 27/00; G09G 3/001; H04N 9/3147; H04N 9/315; H04N 9/3179; H04N 9/3182; H04N 9/3188; H04N 9/3194
See application file for complete search history.

(56) References Cited

U.S. PATENT DOCUMENTS

| | | | |
|---|---|---|---|
| 4,989,126 A | 1/1991 | Preuss | |
| 9,251,577 B2 | 2/2016 | Yamamoto et al. | |
| 2008/0266321 A1 | 10/2008 | Aufranc et al. | |
| 2010/0002197 A1* | 1/2010 | Kaneko | G03B 21/005 353/31 |
| 2010/0177929 A1* | 7/2010 | Kurtz | H04N 9/3161 382/103 |
| 2010/0188548 A1* | 7/2010 | Robinson | H04N 5/222 348/333.01 |
| 2011/0122147 A1* | 5/2011 | Yasukawa | H04N 9/3179 345/589 |

(Continued)

FOREIGN PATENT DOCUMENTS

| | | |
|---|---|---|
| JP | S64-18178 A | 1/1989 |
| JP | 2008-107528 A | 5/2008 |

(Continued)

*Primary Examiner* — Magda Cruz
(74) *Attorney, Agent, or Firm* — Oliff PLC

(57) ABSTRACT

A second projector disposed so as to be opposed to a projection surface includes a projection section configured to project second image light on the projection surface on which a base image is displayed, and visibility of the base image on which the second image light is projected is made lower than in a state in which the second image light is not projected on the projection surface.

17 Claims, 10 Drawing Sheets

(56) References Cited

U.S. PATENT DOCUMENTS

| | | | | |
|---|---|---|---|---|
| 2011/0206349 A1* | 8/2011 | Schultz | ............... | H04N 5/913 |
| | | | | 386/252 |
| 2013/0201403 A1* | 8/2013 | Iversen | ............... | H04N 13/337 |
| | | | | 348/659 |
| 2015/0029314 A1* | 1/2015 | Reichow | ............. | H04N 13/363 |
| | | | | 348/51 |
| 2015/0256803 A1* | 9/2015 | Alhazme | ............ | G02B 27/0006 |
| | | | | 348/746 |
| 2018/0048834 A1* | 2/2018 | Nicholson | ............ | H04N 9/3194 |
| 2018/0275504 A1* | 9/2018 | Ono | ....................... | G03B 21/10 |
| 2020/0007813 A1* | 1/2020 | Ichieda | ............... | H04N 9/3182 |
| 2021/0092335 A1* | 3/2021 | Cramer | ................ | G03B 35/26 |

FOREIGN PATENT DOCUMENTS

| | | | | |
|---|---|---|---|---|
| JP | 2010113568 A | * | 5/2010 | ............ G06F 3/041 |
| JP | 2010-171774 A | | 8/2010 | |
| JP | 2012-159597 A | | 8/2012 | |
| JP | 2014-167701 A | | 9/2014 | |
| JP | 2014-233056 A | | 12/2014 | |
| JP | 2015-103874 A | | 6/2015 | |
| JP | 2016-021206 A | | 2/2016 | |
| JP | 2016-061916 A | | 4/2016 | |
| JP | 2016-071741 A | | 5/2016 | |
| JP | 2017-129865 A | | 7/2017 | |

* cited by examiner

PROJECTOR THAT LOWERS VISIBILITY OF BASE IMAGE, PROJECTION SYSTEM AND PROJECTION METHOD

The present application is based on, and claims priority from JP Application Serial Number 2018-143932, filed Jul. 31, 2018, the disclosure of which is hereby incorporated by reference herein in its entirety.

BACKGROUND

1. Technical Field

The present disclosure relates to a projector, a projection system and a projection method.

2. Related Art

In recent years, an electronic signboard called a digital signage is widely used. In the electronic signboard, there have been proposed a variety of devices in display. For example, JP-A-2017-129865 discloses an information providing method of displaying an information sequence in which light is arranged so as to display information which should be provided, and an occultation sequence in which the light is arranged so as to keep a secret of the information of the information sequence on an LED display while switching between the information sequence and the occultation sequence at high speed.

An advantage of the present disclosure is to enhance interestingness of an image to thereby draw much attention.

SUMMARY

An aspect of the present disclosure is directed to a projector disposed so as to be opposed to a projection surface including a projection section configured to project image light on the projection surface on which a base image is displayed, wherein visibility of the base image on which the image light is projected is made lower than in a state in which the image light is not projected on the projection surface.

The projector described above may be configured such that the projector further includes a detection section configured to detect luminance of the projection surface in the state in which the image light is not projected by the projection section, wherein the projection section projects the image light corresponding to the luminance detected by the detection section.

The projector described above may be configured such that the projector further includes an input section, wherein the projection section projects the image light based on an input received by the input section.

The projector described above may be configured such that the image light corresponds to a camouflage image configured to camouflage the base image.

The projector described above may be configured such that the projector further includes a light source, and a light modulation section having a drawing area in which an image is drawn, and configured to modulate light emitted from the light source with the image drawn in the drawing area to generate the image light, wherein the image drawn in the drawing area includes an image constituted by a diagram, and a size of the diagram is larger than a size of a diagram included in the base image.

The projector described above may be configured such that the projection section projects the image light higher in luminance than the base image on the projection surface.

The projector described above may be configured such that the base image is an image including a larger proportion of blue component and yellow component than another color component, and the image light includes a larger proportion of red component and green component than another color component.

The projector described above may be configured such that the projector further includes an image information input section configured to input information related to a color component of the base image, and a control section configured to change a color component included in the image light to be projected by the projection section based on the information input to the image information input section, wherein the base image is an image projected by another projector configured to project image light corresponding to the base image.

Another aspect of the present disclosure is directed to a projection system including a first projector configured to project first image light on a projection surface, and a second projector installed at a same side as the first projector with respect to the projection surface at a position farther from the projection surface than the first projector, and configured to project second image light to the projection surface, wherein the second projector projects the second image light so as to make visibility of an image formed on the projection surface by the first image light lower than in a state in which the second image light is not projected on the projection surface.

The projection system described above may be configured such that the second projector is disposed at a position where the second projector forms a space to be a passage way with the first projector.

The projection system described above may be configured such that the second image light includes light configured to make luminance of the image formed on the projection surface by the first image light higher than in the state in which the second image light is not projected on the projection surface.

The projection system described above may be configured such that an image formed on the projection surface by the second image light is a camouflage image configured to camouflage the image formed on the projection surface by the first image light.

The projection system described above may be configured such that the projector further includes an image information input section configured to input information related to the first image light to be projected by the first projector, and a control section configured to control the second image light to be projected by the second projector based on the information input to the image information input section.

The projection system described above may be configured such that the first projector projects the first image light based on first image data, the second projector projects the second image light based on second image data, the image information input section inputs information related to a color component of the first image data, and the control section selects the second image data based on the information input to the image information input section, and makes the second projector project the second image light based on the second image data selected.

The projection system described above may be configured such that when the information related to the color component of the first image data input to the image information input section is information representing a blue component and a yellow component, the control section generates the second image data including a larger proportion of red component and green component than another color component.

The projection system described above may be configured such that the first projector projects the first image light based on first image data, the second projector projects the second image light based on second image data, the first image data and the second image data are data of an image constituted by a diagram, and a size of the diagram included in the second image data is larger than a size of the diagram included in the first image data.

Still another aspect of the present disclosure is directed to a projection method including projecting image light on a projection surface by a projector disposed so as to be opposed to the projection surface on which a base image is displayed to make visibility of the base image on which the image light is projected lower than in a state in which the image light is not projected on the projection surface.

Still another aspect of the present disclosure is directed to a projection method including projecting first image light on a projection surface by a first projector, and projecting second image light to the projection surface by a second projector installed at a same side as the first projector with respect to the projection surface at a position farther from the projection surface than the first projector, wherein the second image light projected by the second projector is image light configured to make visibility of an image formed on the projection surface by the first image light lower than in a state in which the second image light is not projected on the projection surface.

DESCRIPTION OF EXEMPLARY EMBODIMENTS

First Embodiment

Figure 1:
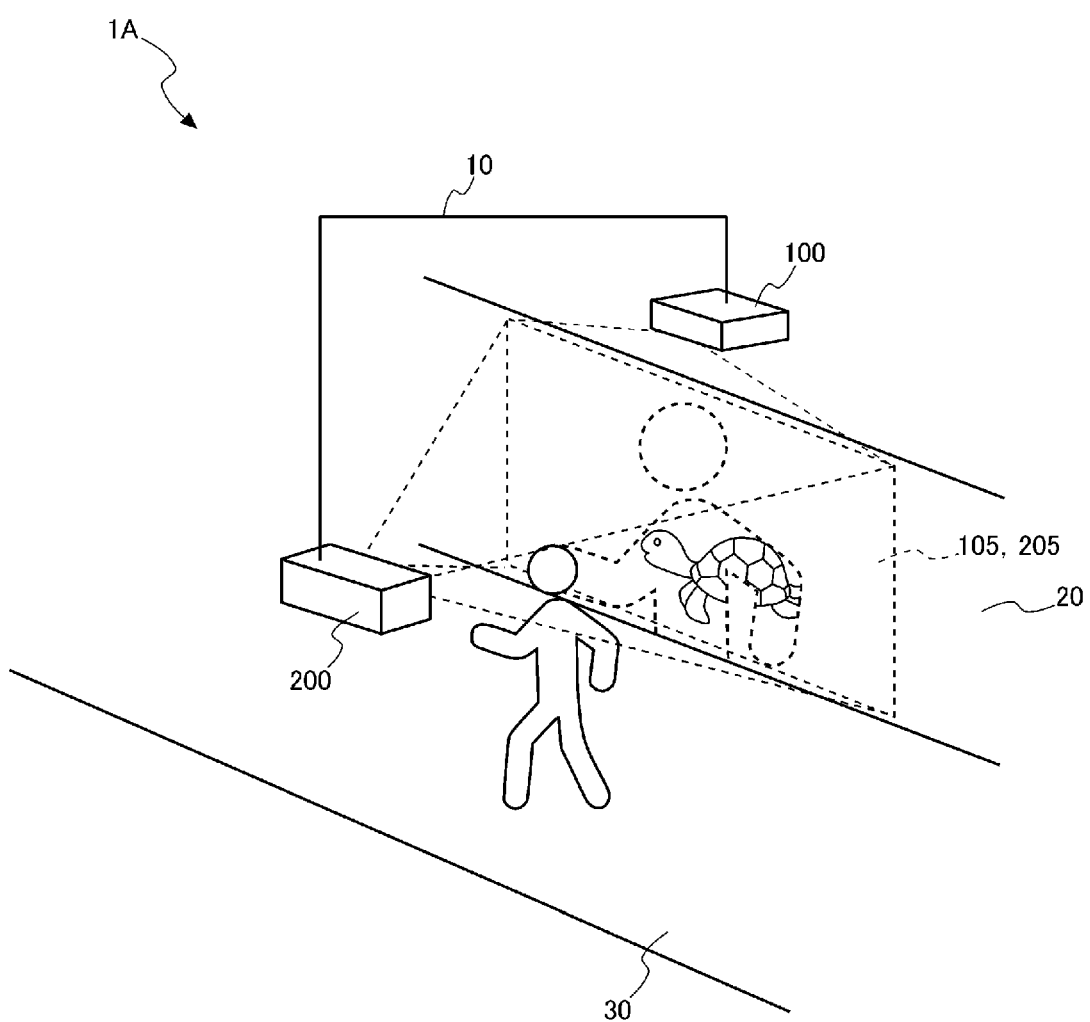
FIG. 1 is a system configuration diagram of a projection system.

Hereinafter, an embodiment of the present disclosure will be described with reference to the accompanying drawings. System Configuration of Projection System 1A FIG. 1 is a system configuration diagram of a projection system 1A.

The projection system 1A is provided with a first projector 100 and a second projector 200. The first projector 100 and the second projector 200 are coupled to each other with a cable 10 in a wired manner. It is also possible to adopt a configuration in which the first projector 100 and the second projector 200 are coupled wirelessly to each other with, for example, wireless LAN or Bluetooth. Bluetooth is a registered trademark. The first projector 100 corresponds to "another projector," and the second projector 200 corresponds to a "projector."

The first projector 100 projects first image light on a projection surface 20. Further, the second projector 200 projects second image light on the projection surface 20. An image formed on the projection surface 20 due to the first image light projected by the first projector 100 is referred to as a base image 105. Further, an image formed on the projection surface 20 due to the second image light projected by the second projector 200 is referred to as a camouflage image 205.

The base image 105 can be a moving image, or can also be a still image. Further, the base image 105 can be an image of a child or an animal, or can also be an advertising image of an enterprise or a product. The advertising image can include, for example, an enterprise mane, a product mane, URL of a WEB page, a map of a store, and a coupon code.

The second projector 200 projects the second image light on the projection surface 20 on which the first image light has already been projected to thereby superimpose the camouflage image 205 on the base image 105. The camouflage image 205 is an image for decreasing the visibility of the base image 105 formed on the projection surface 20. In other words, the visibility of the base image 105 decreases when the base image 105 and the camouflage image 205 are formed on the projection surface 20 compared to when the base image 105 is formed alone on the projection surface 20. For example, when the base image 105 is an advertising image, a person who looks at the projection surface 20 on which the camouflage image 205 is superimposed cannot specifically recognize the picture or the characters even though the person can recognize that some picture or character is displayed.

The first projector 100 and the second projector 200 can be installed in a public space such as a square or a transportation facility. Further, the first projector 100 and the second projector 200 can also be installed in an art gallery, a museum, or a commercial facility such as a shopping mall or a commercial building.

The first projector 100 and the second projector 200 project the images using an exterior wall of a building such as a multistory building, a wall surface of a walk-through of a station, a free passage or the like, a body of a vehicle such as a parked bus as the projection surface 20. Further, it is obviously possible for the first projector 100 and the second projector 200 to project the images using an interior wall or a floor surface, a screen, a curtain, a flat plate or the like as the projection surface 20.

The first projector 100 is a projection device of a short focus type or a super short focus type, and is installed at an obliquely upside of the projection surface 20, and projects the base image 105 toward the projection surface 20 located on an obliquely downside. Further, it is also possible to adopt a configuration in which the first projector 100 is installed at the front surface side of the projection surface 20, and projects the image toward the projection surface 20 located on an obliquely upside. The front surface denotes a surface on the projection surface 20 side on which the first projector 100 and the second projector 200 project the images in FIG. 1.

A projection distance of the second projector 200 is different from a projection distance of the first projector 100, and is longer than the projection distance of the first projector 100. The projection distance is a distance necessary to project an image on the projection surface 20, and is specifically a distance from the projection optical system of the first projector 100 and the second projector 200 to the projection surface 20. The second projector 200 is installed at a position farther from the projection surface 20 than the first projector 100. FIG. 1 shows an example in which the first projector 100 and the second projector 200 are disposed across a passage way 30. In other words, the first projector 100 and the second projector 200 are disposed across the space formed by the passage way 30 from each other. The second projector 200 is installed at the same side as the first projector 100 with respect to the projection surface 20. The first projector 100 is installed in an upper part of the wall surface on the projection surface 20 side, and the second projector 200 is installed on the wall surface opposed to the wall surface forming the projection surface 20 across the passage way 30.

Configuration of First Projector 100 and Second Projector 200

Figure 2:
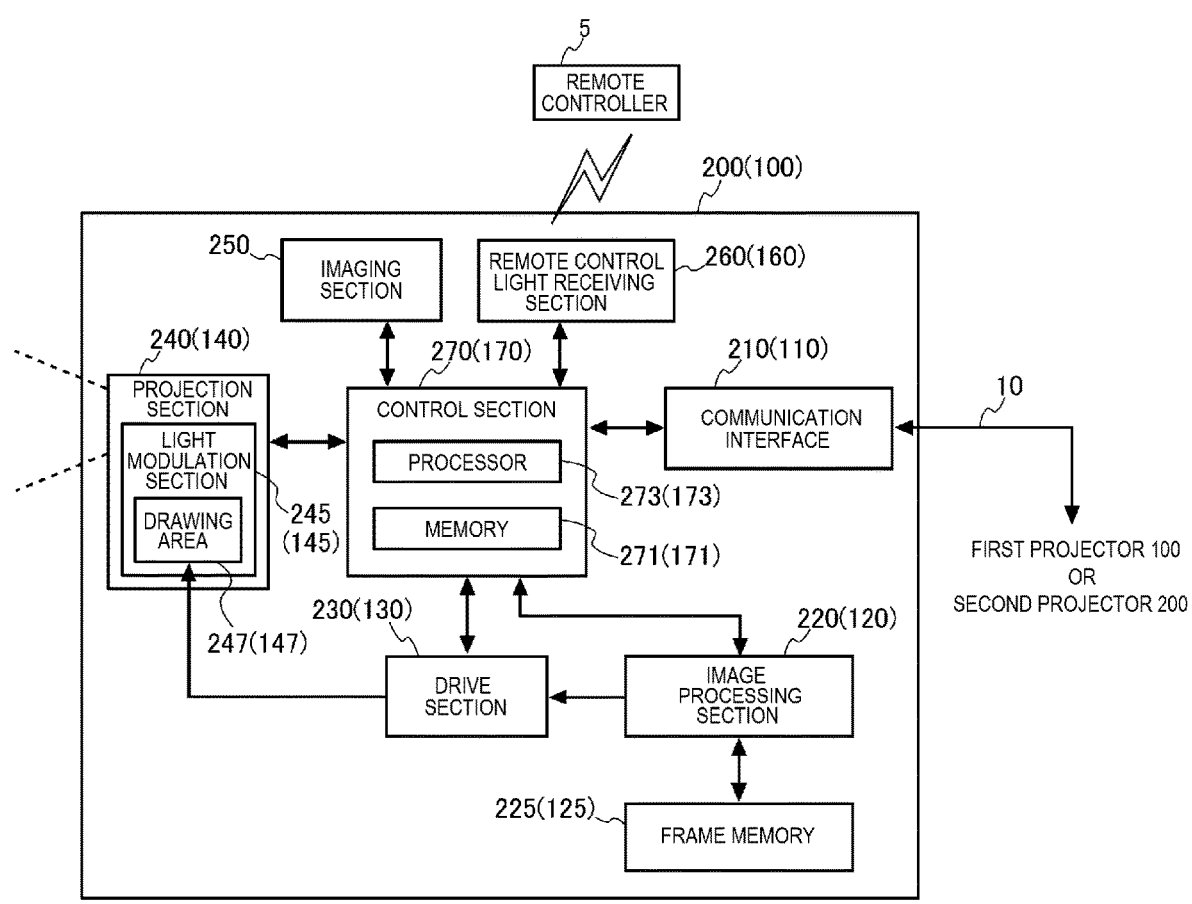
FIG. 2 is a configuration diagram of first and second projectors.

FIG. 2 is a diagram showing a configuration of the first projector 100 and the second projector 200. The configuration of the first projector 100 and the second projector 200 will be described with reference to FIG. 2. Since the first projector 100 and the second projector 200 are different in the configuration corresponding to the projection distance, but are substantially the same in the other configuration as described above, the configuration of the second projector 200 will hereinafter be described. In FIG. 2, the reference numerals described in parentheses following the reference numerals denoting the respective constituents of the second projector 200 denote the constituents of the first projector 100.

Further, FIG. 2 shows functional blocks which represent functions or hardware provided to the first projector 100 and the second projector 200 with blocks. Each of the functional blocks can be configured with an independent hardware resource, or can also be defined as a constituent realized by cooperation between hardware and software.

The second projector 200 is provided with a communication interface 210, an image processing section 220, a frame memory 225, a drive section 230, a projection section 240, an imaging section 250, a remote control light receiving section 260 and a control section 270. Further, the first projector 100 is provided with a communication interface 110, an image processing section 120, a frame memory 125, a drive section 130, a projection section 140, a remote control light receiving section 160 and a control section 170.

The communication interface 210 is a wired interface for data communication, and is provided with a connector and an interface circuit compliant with a predetermined communication standard. Illustration of the connector and the interface circuit will be omitted. The communication interface 210 is couple to the first projector 100 via a cable 10. The communication interface 210 operates as an image information input section for inputting information related to first image light from the first projector 100. The communication interface 210 transmits and receives image information described later with the first projector 100 in accordance with control by the control section 270. The image information is information related to the first image light projected by the first projector 100, and includes, for example, information related to color components of the first image light.

The image processing section 220 develops second image data, which is input from the control section 270, in the frame memory 225. The control section 270 retrieves the second image data from a memory 271, and then outputs the second image data to the image processing section 220. The second image data is image data which the camouflage image 205 originates from. The frame memory 225 is provided with a plurality of banks. Each of the banks has a storage capacity sufficient for writing one frame of image data. The frame memory 225 is formed of, for example, an SDRAM (synchronous dynamic random access memory).

The image processing section 220 executes image processing such as a resolution conversion process, a resizing process, a correction of a distortion aberration, a shape correction process, a digital zoom process and an adjustment of the tint and luminance of the image on the second image data developed in the frame memory 225. The image processing section 220 executes the process designated by the control section 270, and executes the process using a parameter input from the control section 270 as needed. Further, it is obviously possible for the image processing section 220 to execute two or more of the processes described above in combination with each other. The image processing section 220 retrieves the second image data on which the process has been executed from the frame memory 225, and then outputs the second image data to the drive section 230.

The projection section 240 is provided with a light source, a light modulation section 245 and a projection optical system. Illustration of the light source and the projection optical system will be omitted. The light source is a lamp such as a halogen lamp, a xenon lamp or a super-high pressure mercury lamp, or a solid-state light source such as an LED or a laser source. The light modulation section 245 is provided with a drawing area 247 in which the image is drawn. The light modulation section 245 modulates the light emitted by the light source with the drawing area 247 in which the image has been drawn to thereby generate image light. The projection optical system is provided with an optical element such as a lens or a mirror, and images the image light modulated by the light modulation section 245 on the projection surface 20. Illustration of the optical element such as a lens or a mirror will be omitted. The drawing area 247 can be formed of a transmissive or reflective liquid crystal panel. Further, the light modulation section 245 can also be configured by DLP (digital light processing) using a DMD (digital micromirror device) in the drawing area 247.

The drive section 230 is provided with a motor, a drive circuit and so on, and drives the projection section 240. For example, the drive section 230 supplies the light source with electrical power in accordance with the control by the control section 27 to put on or off the light source. Further, the drive section 230 draws the image based on the image data input from the image processing section 220 in the drawing area 247. Further, the drive section 230 controls rotation of the motor to perform a zoom adjustment or a focus adjustment.

The imaging section 250 is a digital camera module provided with an image sensor such as a CMOS (complementary metal oxide semiconductor) or a CCD (charge coupled device), and an imaging optical system such as a lens for forming a subject image on a light receiving area of the image sensor. The imaging section 250 can also be formed of a WEB camera, a digital still camera, a digital video camera, an entire celestial sphere camera and so on. The imaging section 250 outputs taken image data thus taken to the control section 270.

The remote control light receiving section 260 receives an infrared signal transmitted from a remote controller 5. The remote control light receiving section 260 decodes the infrared signal thus received to generate an operation signal, and then outputs the operation signal thus generated to the control section 270.

The control section 270 is provided with the memory 271, a processor 273 and other peripheral circuits. In FIG. 1, illustration of the peripheral circuits will be omitted. The control section 270 and the image processing section 220 can also be formed of a hardware circuit such as an FPGA (field-programmable gate array) or an ASIC (application specific integrated circuit) independently of or integrally with each other. Further, the control section 270 and the image processing section 220 can also be formed of a CPU (central processing unit) of an MPU (microprocessor unit) for executing a program to realize a predetermined function independently of or integrally with each other.

The memory 271 is a storage device. The memory 271 can be formed of a nonvolatile storage device, or can also be formed of a nonvolatile storage device and a volatile storage device. The nonvolatile storage device can be formed of, for example, a semiconductor memory such as an EEPROM or a flash memory. The volatile storage device can be formed of, for example, a RAM.

The memory 271 stores a control program executed by the processor 273 and the second image data which the camouflage image 205 to be projected by the projection section 240 originates from.

Further, the memory 171 of the first projector 100 stores a control program executed by the processor 173 and the image data which the base image 105 to be projected by the projection section 140 originates from. The image data which the base image 105 originates from is referred to as first image data.

The first image data and the second image data can be data supplied from an external device. Although not shown in FIG. 1, for example, the first projector 100 is provided with an interface capable of inputting the image data such as an HDMI interface. The first projector 100 processes the image data received by the interface, and then projects the image based on the image data having been processed on the projection surface 20. HDMI is a registered trademark.

The processor 273 can be formed of a single processor, or can also be formed of a plurality of processors. Further, the processor 273 can also be formed of an SoC (system on a chip) in which the processor is integrated with a part or the whole of the memory 271 and the other circuits. Further, the processor 273 can also be formed of a combination of a CPU for executing a program and a DSP (digital signal processor) for executing an arithmetic process. Further, it is also possible to adopt a configuration in which all of the functions of the processor 273 are implemented in the hardware, or it is also possible to configure all of the functions of the processor 273 using a programmable device.

The processor 273 executes the control program stored in the memory 271 to control each section of the second projector 200. For example, the processor 273 outputs an execution instruction of image processing corresponding to the operation received by the remote controller 5, and parameters used in the image processing to the image processing section 220. The parameters include, for example, geometric correction parameters for correcting a geometric distortion of the image to be projected on the projection surface 20. Further, the processor 273 controls the drive section 230 to draw the image based on the image data processed by the image processing section 220 in the drawing area 247 of the light modulation section 245. Further, the processor 273 controls the projection section 240 to perform an adjustment of a magnification ratio of the projection image and the focus adjustment.

The second projector 200 changes the tint of the camouflage image 205 in accordance with the tint of the base image 105 in order to enhance an effect of decreasing the visibility of the base image 105. Therefore, the control section 270 obtains the image information from the first projector 100, and then controls the second image light to be projected by the projection section 240 based on the image information thus obtained.

Specifically, the control section 270 transmits an acquisition request of information related to the first image light to the first projector 100 every preset period of time. The preset period of time is set based on, for example, a time interval at which the first projector 100 changes the image to be projected on the projection surface 20. Further, when the control section 170 of the first projector 100 changes the first image light to be projected on the projection surface 20, it is possible to transmit the image information of the first image light which has been changed to the second projector 200.

The image information can also be the first image data itself which the base image 105 formed by the first image light originates from. Further, the image information can also be a feature amount of the base image 105 calculated by the first image data. The feature amount is, for example, information representing the tint or the luminance of the base image 105. Further, the feature amount can also be the color component included in the base image 105.

Specifically, the feature amount can also be the tint of the whole of the first image data, or can also be the tint in every preset range. The feature amount can also be the color component of each of the pixels constituting the first image data, or can also be the color component of a representative pixel set in advance. Further, the feature amount can also be an average value of the luminance of the whole of the first image data, or can also be the luminance in every preset range. Further, the feature amount can also be stored in advance in the memory 171, or can also be obtained by the processor 173 with arithmetic processing.

When the control section 270 receives the image information from the first projector 100, the control section 270 selects the second image data to be projected on the projection surface 20 based on the image information thus received.

For example, it is possible for the control section 270 to select the second image data so that the luminance of the second image light to be projected by the second projector 200 on the projection surface 20 becomes a preset luminance value. For example, it is assumed that the first image data is data in which the RGB pixel values of the pixels are each expressed in 256 levels of 0 through 255. Further, the luminance on the projection surface 20 on which the image light forms the image takes a value obtained by adding the luminance of the first image light projected by the first projector 100 and the luminance of the second image light projected by the second projector 200 to each other. The control section 270 selects the pixel value of each of the pixels constituting the second image data so that the sum of the pixel values of the first image data and the pixel values of the second image data becomes 255 or larger.

Further, it is also possible for the control section 270 to select, for example, the second image data the same in tint as the first image data represented by the image information received. For example, when the tint of the first image data is reddish, the control section 270 selects the second image data having the reddish tint. Similarly, when the tint of the first image data is bluish or greenish, the control section 270 selects the second image data having the bluish tint or the greenish tint.

Further, it is also possible for the control section 270 to select the second image data including the same color as the color included in the first image data. Further, when the first image data is the data different in tint between areas, it is also possible for the control section 270 to select the image data having the corresponding tint area by area, and combine the image data thus selected with each other to generate the second image data of one frame.

Further, it is also possible for the control section 270 to change the tint of the second image data in the image processing section 220 based on the image information received from the first projector 100.

For example, when four colors of red, green, blue and yellow are used as the colors of the image, there is a property that red and green seem strong. Red corresponds to a red component, green corresponds to a green component, blue corresponds to a blue component and yellow corresponds to a yellow component.

When the tint of the first image data represented by the image information is the coloration including a higher proportion of blue and yellow than other color components, the control section 270 issues an instruction to the image processing section 220 so that the second image data includes a higher proportion of reddish component and greenish component than other color components. The image processing section 220 changes the tint of the second image data so that a higher proportion of reddish component and greenish component is included than other color components in accordance with the instruction of the control section 270.

Further, it is also possible to adopt a configuration in which the image processing section 120 of the first projector 100 changes the tint of the first image data, and the image processing section 220 of the second projector 200 changes the tint of the second image data. For example, it is also possible for the image processing section 120 to convert the first image data into the bluish tint or the yellowish tint, and it is possible for the image processing section 220 to convert the second image data into the reddish tint and the greenish tint.

Further, it is also possible to use the property that six colors of red, green, blue, cyan, magenta and yellow are strong in the images projected by the first projector 100 and the second projector 200.

The image processing section 120 changes the coloration of the first image data to the coloration using the six colors of red, green, blue, cyan, magenta and yellow due to the control by the control section 170. Further, the image processing section 220 changes the coloration of the second image data to the coloration using intermediate colors of the six colors of red, green, blue, cyan, magenta and yellow due to the control by the control section 270. The intermediate colors are specifically an intermediate color between red and magenta, an intermediate color between red and yellow, an intermediate color between green and yellow, an intermediate color between green and cyan, an intermediate color between blue and cyan and an intermediate color between blue and magenta.

Further, it is also possible to arrange that the second image light to be projected by the second projector 200 includes the light which makes the luminance of the base image 105 formed on the projection surface 20 by the first image light projected by the first projector 100 higher than in the state in which the second image light is not projected.

For example, in the case of the additive color mixture, when a certain colored light beam is added with a colored light beam different in color from the certain colored light beam, the light intensity increases in a part where the colored light beams overlap each other, and the luminance of the colored light beam obtained by mixing the certain colored light beam and the colored light beam different in color from the certain colored light beam with each other becomes the sum of the luminance of the certain colored light beam and the luminance of the colored light beam different in color from the certain colored light beam. By increasing the luminance of the colored light beam, it is possible to decrease the visibility of the base image 105. For example, when the tint of the base image 105 is red, the control section 270 selects the second image data of at least one of green and blue. Further, when the tint of the base image 105 is green, the control section 270 selects the second image data of at least one of red and blue. Further, when the tint of the base image 105 is blue, the control section 270 selects the second image data of at least one of red and green.

The image processing section 220 develops the second image data, which is input from the control section 270, in the frame memory 225 and then processes the second image data. The image processing section 220 converts the second image data developed in the frame memory 225 into a dot pattern in which the image is formed by a plurality of dots.

Further, the image processing section 120 of the first projector 100 also converts the first image data developed in the frame memory 125 into a dot pattern. The size of each of the dots constituting the dot pattern converted by the image processing section 220 is larger than the size of each of the dots constituting the dot pattern converted by the image processing section 120. Thus, it is possible to effectively hide the dots constituting the base image 105 projected by the first projector 100 with the dots constituting the camouflage image 205 projected by the second projector 200. Therefore, it is possible to effectively decrease the visibility of the base image 105 to enhance the effect of hiding the base image 105 with the camouflage image 205.

Although there is described when converting the images of the first image data and the second image data into the dot pattern in which the image is constituted by the dots as a diagram in the present embodiment, the shape of the dot as a diagram is arbitrary, and can also be a circle, or a polygon such as a triangle or a quadrangle.

Further, in the present embodiment, the first image data is converted into the dot pattern constituted by the dots the same in size, and the second image data is converted into the dot pattern constituted by the dots the same in size. As a modified example, it is possible to convert the first image data and the second image data with a dot pattern constituted by dots different in size.

In this case, it is also possible to arrange that an average value of the sizes of the dots included in the dot pattern into which the second image data is converted is larger than an average value of the sizes of the dots included in the dot pattern into which the first image data is converted. Further, it is also possible to arrange that the sizes of all of the dots included in the dot pattern into which the second image data is converted are larger than the sizes of all of the dots included in the dot pattern into which the first image data is converted.

In the explanation described above, there is described when the control section 270 selects the second image data based on the image information received from the first projector 100. As another method of selecting the second image data, it is also possible to adopt a configuration in which the information representing the tint or the luminance of the first image data, and the second image data corresponding to the tint or the luminance are stored in the memory 271 in advance. The control section 270 obtains the information representing the tint or the luminance from the image information thus received, retrieves the second image data associated with the tint or the luminance thus obtained from the memory 271, and then outputs the second image data thus retrieved to the image processing section 220.

Figure 3:
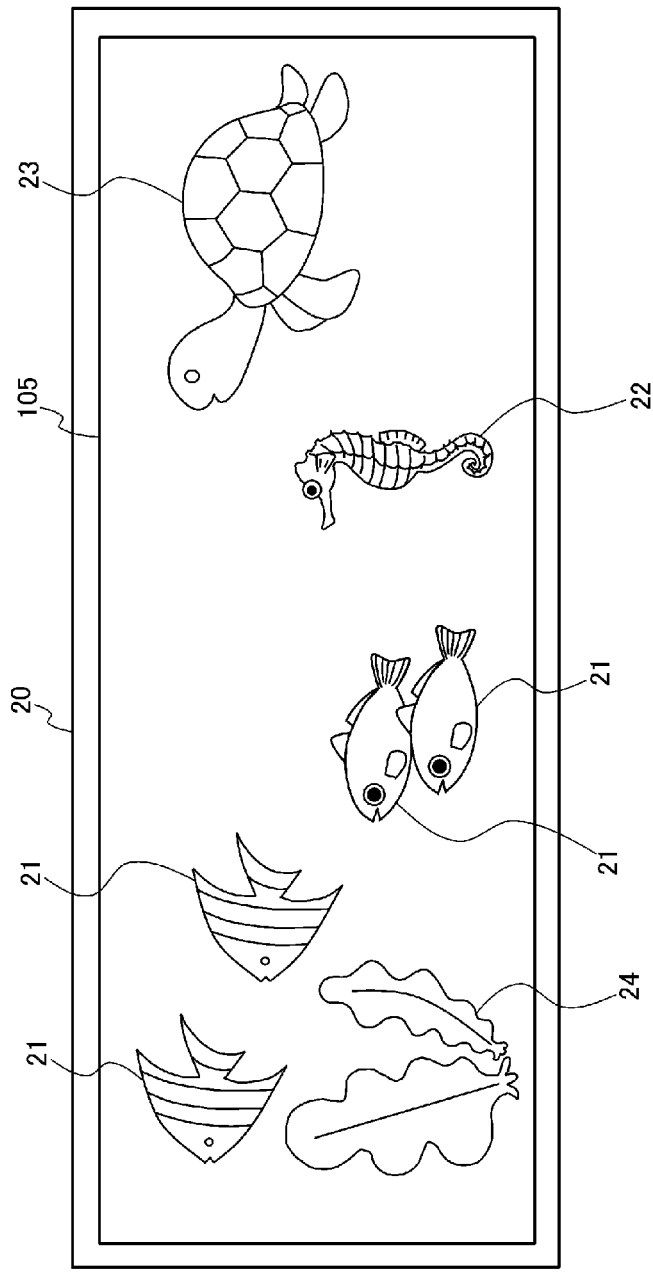
FIG. 3 is a diagram showing an example of abase image.

FIG. 3 is a diagram showing an example of the base image 105 projected by the first projector 100 on the projection surface 20. In the base image 105, there are displayed images of fishes 21, a sea horse 22 and a turtle 23 as creatures swimming under the sea, and seaweed 24.

Figure 4:
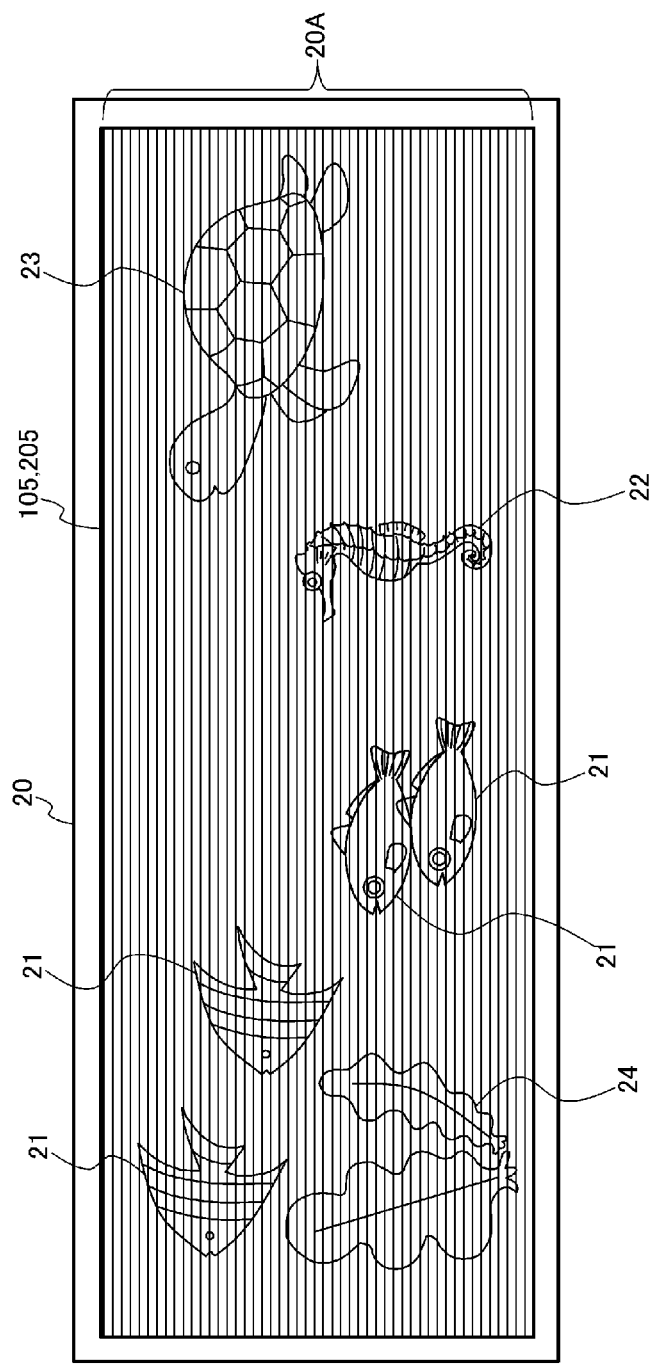
FIG. 4 is a diagram showing a state in which a camouflage image is superimposed on the base image.

FIG. 4 is a diagram showing the state of superimposing the camouflage image 205 on the base image 105 shown in FIG. 3. In FIG. 4, the area 20A provided with hatching represents the area in which the camouflage image 205 is projected. When the camouflage image 205 is superimposed on the base image 105, the luminance of the area 20A rises, and the visibility of the base image 105 decreases. Thus, the images of the fishes 21, the sea horse 22, the turtle 23 and the seaweed 24 included in the base image 105 are hidden by the camouflage image 205. Therefore, it is unachievable for those looking at the projection surface 20 from a distant place to determine what image is projected on the projection surface 20.

Figure 5:
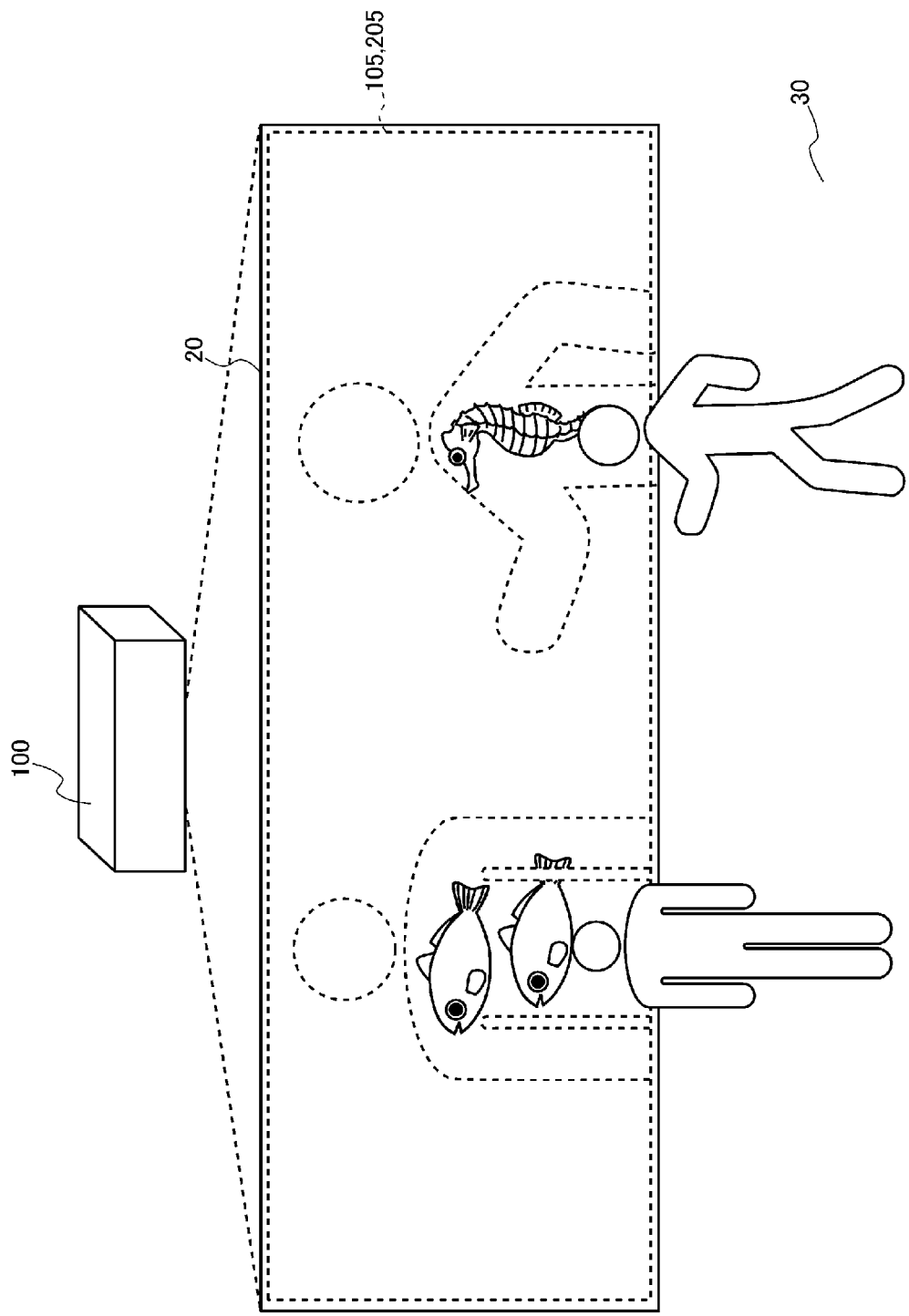
FIG. 5 is a diagram showing a state in which image light of the camouflage image is blocked by a passerby.

FIG. 5 is a diagram showing the state in which the second image light projected by the second projector 200 is blocked by a passerby in the passage way 30. In FIG. 5, illustration of the second projector 200 is omitted.

When the passerby passes through the passage way 30, the second image light projected by the second projector 200 is blocked by the passerby. The second image light blocked by the passerby is not projected on the projection surface 20. When the passerby looks at an area where the second image light is blocked and the first image light alone is projected, the passerby can visually recognize the base image 105 formed on the projection surface 20. Further, the image which the passerby can visually recognize is not the whole of the base image 105, but the area corresponding to the second image light blocked by the passerby. In other words, the image which the passerby can visually recognize is an area shadowed by the passerby of the base image 105.

As described hereinabove, it is possible for the projection system 1A according to the present embodiment to make it apparently unrecognizable what is displayed on the projection surface 20 by decreasing the visibility of the base image 105 with the camouflage image 205. Further, since it is possible for the passerby to visually recognize the base image 105 by blocking the second image light projected by the second projector 200 to form a shadow on the projection surface 20, it is possible to provide a feeling of thrill, an entertainment and a game feeling.

Further, although FIG. 1 shows when the projection system 1A is constituted by the two projectors, namely the first projector 100 and the second projector 200, it is also possible to further increase the number of the projectors constituting the projection system 1A.

For example, it is also possible to arrange that the complete base image 105 is formed by combining images projected by a plurality of first projectors 100 with each other. In other words, the complete base image 105 is projected using tiling projection. Specifically, it is also possible to arrange that the plurality of first projectors 100 is arranged in a direction parallel to the passage way 30 to project a horizontally long image. In this case, the installation state of the first projectors 100 and the sizes of the images to be projected are adjusted so that no gap occurs between the images to be projected.

Further, the same number of second projectors 200 as the number of the first projectors 100 are also disposed. In other words, the first projector 100 is associated one-to-one with the second projector 200, and it is arranged that the image projected by the first projector 100 is superimposed with the image projected by the associated second projector 200.

Thus, it is possible to include a plurality of images in the image projected as the base image 105 on the projection surface 20, and it is possible for the passerby to enjoy a change of the base image 105 displayed while passing through the passage way 30. For example, when projecting creatures in an aquarium as the base image 105, it is possible for the passerby to visually recognize the images of the creatures bred in the aquarium while passing through the passage way 30.

Figure 6:
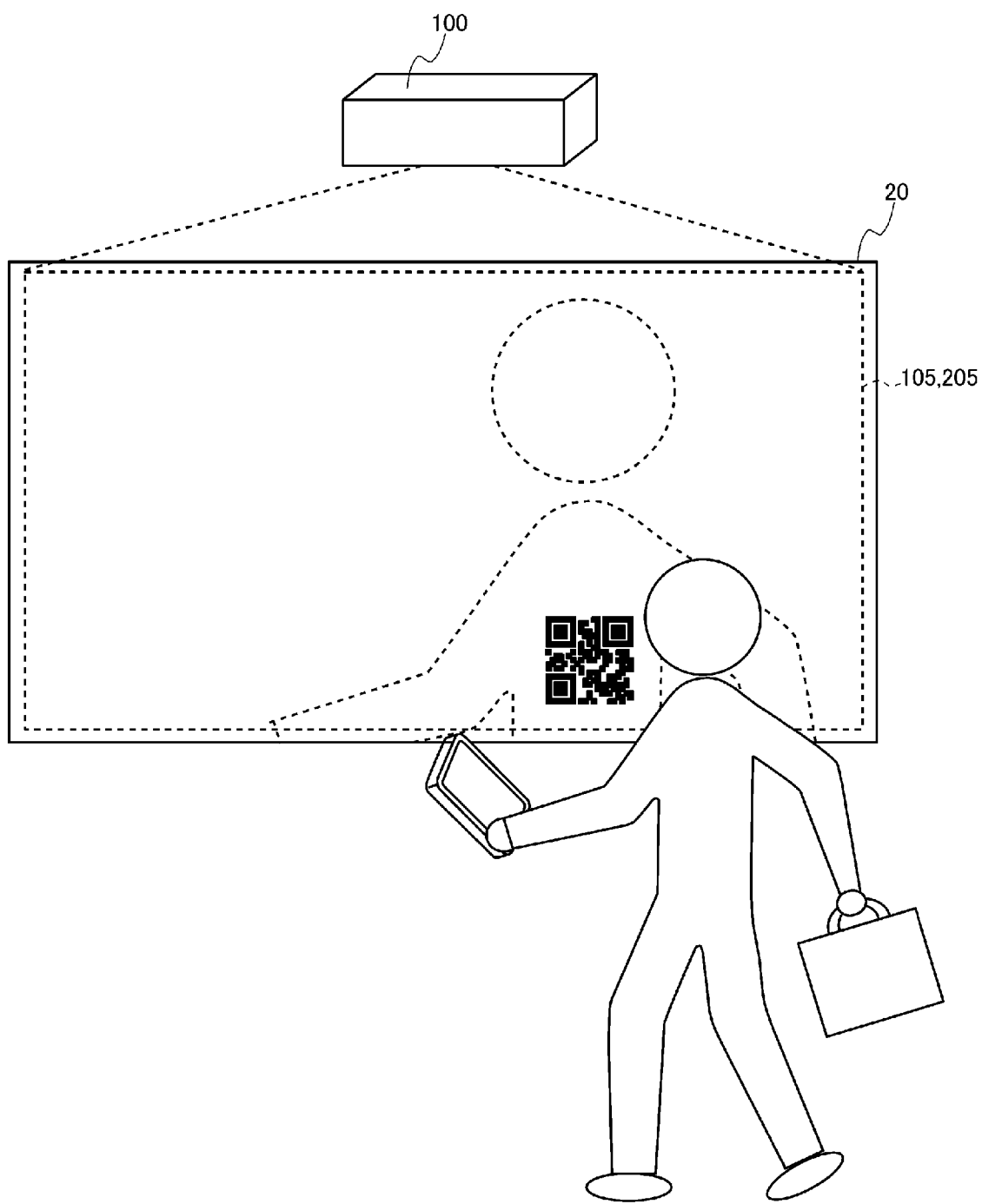
FIG. 6 is a diagram showing when a two-dimensional code is included in a part of the base image.

FIG. 6 is a diagram showing when a two-dimensional code such as a QR code is included in a part of the base image 105. The QR code is a registered trademark. The QR code is hidden by the camouflage image 205, and it is unrecognizable where the QR code is located in the base image 105. Therefore, the passerby has to block the camouflage image 205 while moving the location to search for the QR code. Therefore, it is possible to elongate the duration of the stay of the passerby in the image projected on the projection surface 20. Further, it is possible to make the passerby visually recognize the whole of the base image 105 in which advertisement and so on is displayed, and it is possible to provide a coupon code only to those looking at the advertisement with extreme caution.

Further, although FIG. 4 shows when the whole of the base image 105 is hidden by the camouflage image 205, it is also possible to hide a part of the base image 105 with the camouflage image 205.

For example, as a habit of human, there is a habit that when a part of an image is hidden, there occurs a desire to see the hidden part. For example, by hiding only the face part out of an image of a human with the camouflage image 205, it is possible to attract the interest of the passerby, and it is possible to increase the attention to the advertisement.

Operation Flow of Second Projector

Figure 7:
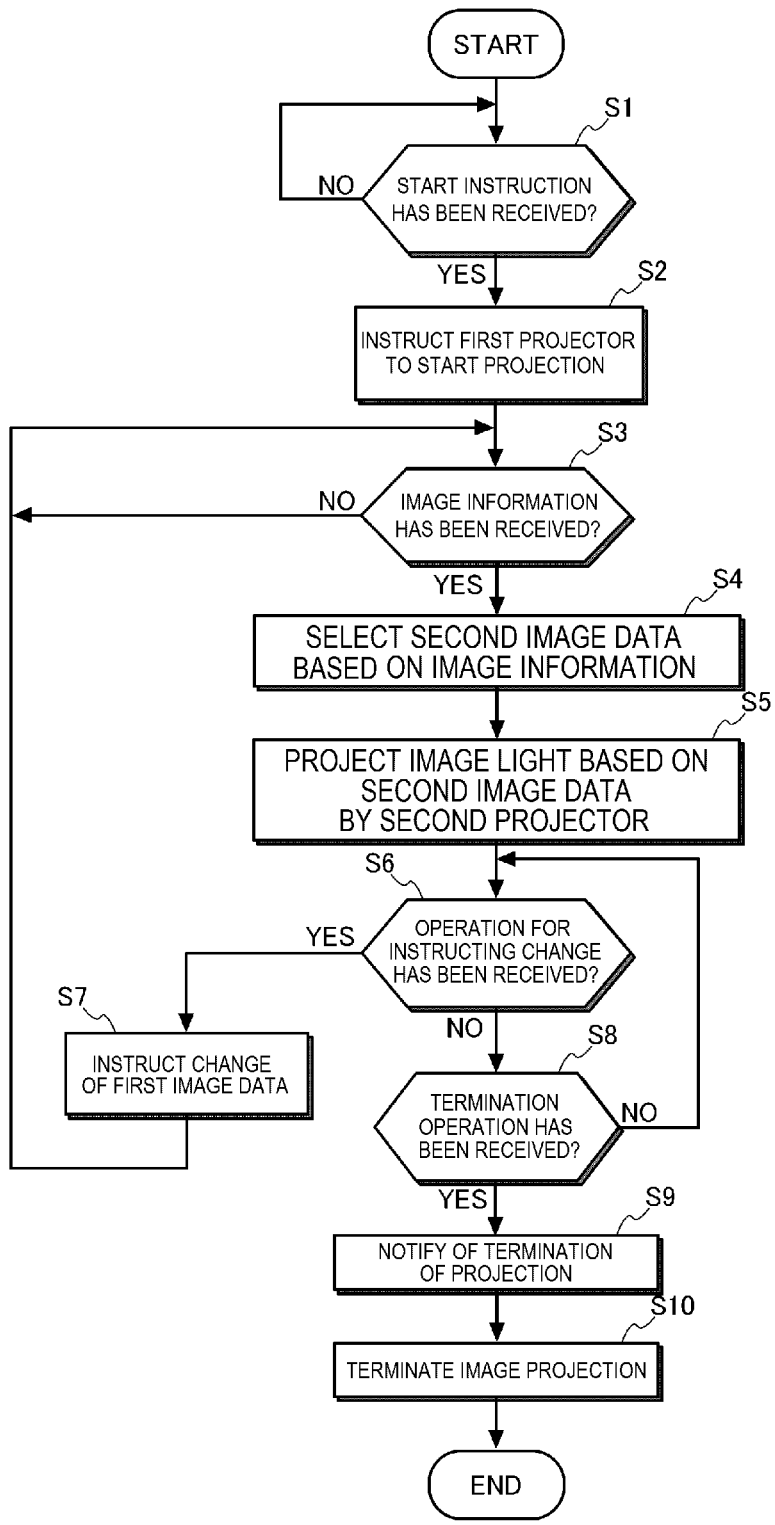
FIG. 7 is a flowchart showing an operation of the second projector.

FIG. 7 is a flowchart showing the operation of the second projector 200. In the operation flow shown in FIG. 7, there will be described the operation when the second projector 200 receives the operation of the remote controller 5, and then transmits an instruction corresponding to the operation thus received to the first projector 100. In other words, the flow is a flow of the second projector 200 when the second projector 200 operates as a master device to issue an instruction of the operation to the first projector 100 operating as a slave device.

Firstly, the control section 270 determines (step S1) whether or not the remote control light receiving section 260 has received a start instruction of the projection. When the control section 270 has not received an operation of instructing the start (NO in the step S1), the control section 270 stands ready to start the process until the control section 270 receives the operation.

Further, when the control section 270 has received the operation of starting the projection of an image (YES in the step S1), the control section 270 instructs (step S2) the first projector 100 to start the projection of the image.

The first projector 100 instructed to start the projection selects, for example, the first image data set in advance, and then makes the projection section 140 project the first image light based on the first image data thus selected. Thus, the base image 105 corresponding to the first image light is formed on the projection surface 20.

Further, it is also possible to arrange that the remote control light receiving section 260 receives the selection of the first image data to be projected by the first projector 100. For example, thumbnail images corresponding respectively to the plurality of first image data stored in the memory 171 of the first projector 100 are stored in advance in the memory 271. Further, identification information is set to each of the plurality of first image data stored in the memory 171. The memory 271 stores the identification information of the respective first image data in association with the corresponding thumbnail images.

When the control section 270 has received the operation of selecting the first image data, the control section 270 retrieves the plurality of thumbnail images from the memory 271, and then displays the plurality of thumbnail images on the display section 210. Then, when the control section 270 has received the operation of selecting one of the thumbnail images, the control section 270 transmits the identification information of the first image data corresponding to the thumbnail image thus selected to the first projector 100. The first projector 100 projects the base image 105 based on the first image data corresponding to the identification information received from the second projector 200 on the projection surface 20.

When the first projector 100 projects the base image 105 on the projection surface 20, the first projector 100 transmits the image information of the first image data which the base image 105 originates from to the second projector 200.

The control section 270 determines (step S3) whether or not the image information has been received from the first projector 100. When the image information has not been received (NO in the step S3), the control section 270 waits until the image information is received. Further, when the control section 270 has received the image information (YES in the step S3), the control section 270 selects (step S4) the second image data based on the image information thus received. Specifically, the control section 270 obtains the information representing the tint of the first image data from the image information thus received, and then selects the second image data including the color represented by the information representing the tint thus obtained.

Further, the control section 270 retrieves the second image data, which is associated with the information representing the tint thus obtained, from the memory 271. The control section 270 controls each section of the second projector 200 to project (step S5) the second image light based on the second image data thus retrieved on the projection surface 20. Thus, the camouflage image 205 corresponding to the second image light is formed on the projection surface 20, and thus, the base image 105 is hidden by the camouflage image 205.

Then, the control section 270 determines (step S6) whether or not a change of the first image data has been instructed. Although in this operation flow, there is described when the change of the first image data is received by the operation of the remote controller 5, it is also possible for the control section 270 to change the first image data based on another trigger. For example, it is also possible for the control section 270 to instruct the first projector 100 to change the first image data every time the preset period of time elapses.

When the control section 270 has not received the operation of instructing the change of the first image data (NO in the step S6), the control section 270 determines (step S8) whether or not a termination operation of terminating the projection of the image has been received. When the control section 270 has received the termination operation (YES in the step S8), the control section 270 notifies (step S9) the first projector 100 of the termination of the projection, and terminates (step S10) the projection of the camouflage image 205 on the projection surface 20 to terminate the process.

Further, when the control section 270 has received the operation of instructing the change of the first image data (YES in the step S6), the control section 270 instructs (step S7) the first projector 100 to change the first image data. When the first projector 100 has received the instruction to change the first image data from the second projector 200, the first projector 100 changes the first image data. It is also possible for the first projector 100 to select the first image data to subsequently be projected in accordance with the setting order set in advance. Further, when the first projector 100 has received the identification information of the first image data from the second projector 200, it is also possible for the first projector 100 to process the first image data corresponding to the identification information thus received to generate the dot pattern, and then project the dot pattern on the projection surface 20.

Then, when the control section 270 instructs (step S7) the change of the first image data, the control section 270 returns to the determination in the step S3 to determine whether or not the image information has been received from the first projector 100. When the control section 270 has received the image information (YES in the step S3), the control section 270 selects (step S4) the second image data based on the image information thus received.

In the flowchart shown in FIG. 7, there is described when the second projector 200 receives the operation, and then transmits an instruction corresponding to the operation thus received to the first projector 100. As another operation, it is possible to adopt a configuration in which the first projector 100 receives the operation, and then transmits an instruction corresponding to the operation thus received to the second projector 200.

Figure 8:
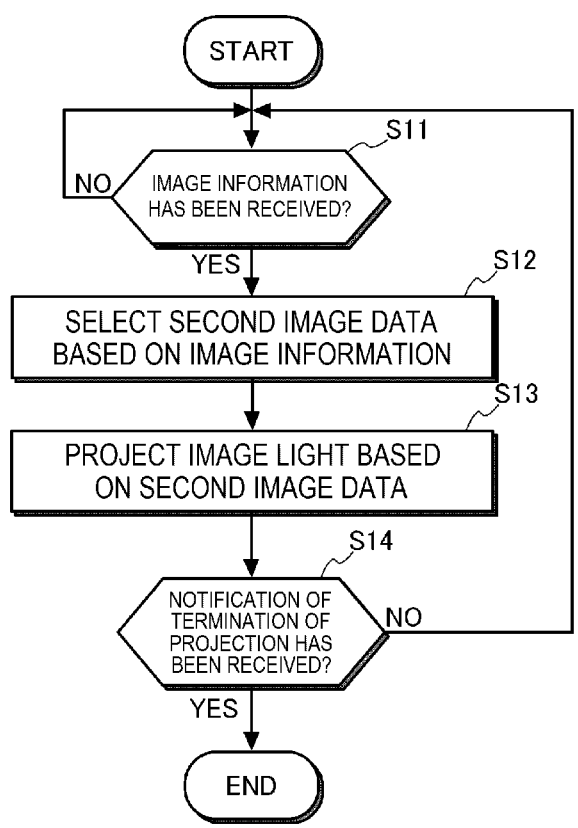
FIG. 8 is a flowchart showing an operation of the second projector.

FIG. 8 is a flowchart showing an operation of the second projector 200 when the first projector 100 receives the operation of the remote controller 5, and then transmits an instruction corresponding to the operation thus received to the second projector 200. In other words, the flow is a flow of the second projector 200 when the first projector 100 operates as the master device to issue an instruction of the operation to the second projector 200 operating as the slave device.

When the remote control light receiving section 260 has received the instruction to start projection of the image and the selection of the image to be projected, the first projector 100 performs the image processing on the first image data thus selected using the image processing section 120 to generate the dot pattern. The first projector 100 projects the base image 105 as an image based on the dot pattern thus generated on the projection surface 20.

When the first projector 100 projects the base image 105 on the projection surface 20, the first projector 100 generates the image information of the first image data which the base image 105 originates from, and then transmits the image information thus generated to the second projector 200. There will be described the processing flow of the second projector 200 when the information representing the tint of the first image data is included in the image information.

The control section 270 of the second projector 200 determines (step S11) whether or not the image information has been received from the first projector 100 via the communication interface 210. When the image information has not been received (NO in the step S11), the control section 270 waits until the image information is received.

Further, when the control section 270 has received the image information (YES in the step S11), the control section 270 obtains the information representing the tint of the first image data from the image information thus received. The control section 270 selects (step S12) the second image data based on the tint of the first image data thus obtained, and then obtains the second image data thus selected from the memory 271.

When the control section 270 obtains the second image data, the control data 270 outputs the second image data thus obtained to the image processing section 220. The image processing section 220 develops the second image data thus input in the frame memory 125 to generate the dot pattern, and then projects (step S13) the camouflage image 205 as an image based on the dot pattern thus generated on the projection surface 20.

Then, the control section 270 determines (step S14) whether or not the notification of the termination of the projection has been received from the first projector 100. When the first projector 100 receives the operation of the termination of the projection with the remote control light receiving section 160, the first projector 100 terminates the projection of the base image 105, and then notifies the second projector 200 of the termination of the projection. When the control section 270 has not received the notification of the termination of the projection from the first projector 100 (NO in the step S14), the control section 270 returns to the determination in the step S11 to determine whether or not the image information has been received from the first projector 100. Further, when the control section 270 has received the notification of the termination of the projection (YES in the step S14), the control section 270 terminates the operation corresponding to this processing flow.

As described hereinabove, the projection system 1A according to the first embodiment is provided with the first projector 100 and the second projector 200.

The first projector 100 projects the first image light to thereby project the base image 105 on the projection surface 20.

The second projector 200 is installed at the same side as the first projector 100 with respect to the projection surface 20, and at the position farther from the projection surface 20 than the first projector 100. The second projector 200 projects the second image light to the projection surface 20.

The second image light projected by the second projector 200 makes the visibility of the base image 105 lower than in the state in which the second image light is not projected on the projection surface 20.

Therefore, by the second projector 200 projecting the second image light on the projection surface 20 or stopping the projection of the second image light, it is possible to hide or show the base image 105 displayed on the projection surface 20. Therefore, it is possible to entertain those looking at the base image 105 projected on the projection surface 20, and to arrange that the base image 105 draws a lot of attention.

Further, the second projector 200 is disposed at a position where the second projector 200 can form a space to be the passage way 30 with the first projector 100.

Therefore, by the passerby passing through the passage way 30 blocking the second image light projected by the second projector 200, it becomes possible to visually recognize the base image 105. Therefore, it is possible to entertain those looking at the base image 105, and to arrange that the base image 105 draws a lot of attention.

Further, the second image light includes the color included in the base image 105 formed on the projection surface 20 by the first image light.

Therefore, it is possible to effectively decrease the visibility of the base image 105 with the second image light.

Further, the second image light includes the light which makes the luminance of the base image 105 formed on the projection surface 20 by the first image light higher than in the state in which the second image light is not projected on the projection surface 20.

Therefore, it is possible to rise the luminance of the base image 105 formed on the projection surface 20, and thus, it is possible to effectively decrease the visibility of the base image 105 with the second image light.

Further, the second projector 200 is provided with the communication interface 210 operating as the image information input section, and the control section 270.

The communication interface 210 receives the information related to the first image light projected by the first projector 100 from the first projector 100. The control section 270 controls the second image light projected by the second projector 200 based on the information received by the communication interface 210.

Therefore, even when the first image light projected by the first projector 100 is changed, it is possible to effectively decrease the visibility of the base image 105 with the second image light.

Further, the first projector 100 projects the first image light based on the first image data. The second projector 200 projects the second image light based on the second image data. The communication interface 210 inputs the image information including the information related to the color component of the first image data from the first projector 100. The control section 270 obtains the information related to the color component of the first image data from the image information thus received, and then selects the second image data based on the information related to the color component thus obtained. Further, the control section 270 makes the projection section 240 project the second image light based on the second image data thus selected.

Therefore, even when the tint of the first image data is changed, by projecting the second image data corresponding to the tint of the first image data having been changed on the projection surface 20, it is possible to effectively decrease the visibility of the base image 105 with the second image light.

Further, when the information of the color component included in the image information thus received is the information representing blue and yellow, the control section 270 performs the image processing on the second image data so that the second image data includes a larger proportion of red and green than other color components.

When four colors of red, green, blue and yellow are used as the colors of the image, there is a property that red and green seem strong. Using this property, the first image data is made to correspond to an image including a larger proportion of blue and yellow than other color components, and the second image data is made to correspond to an image including a larger proportion of red and green than other color components. Thus, it is possible to effectively decrease the visibility of the base image 105 with the second image light.

Further, in the projection system LA, the first projector 100 projects the first image light on the projection surface 20 based on the first image data, and the second projector 200 projects the second image light on the projection surface 20 based on the second image data.

The first image data and the second image data are each the data of a dot pattern in which the image is constituted by a plurality of dots as a plurality of diagrams. Further, the size of each of the dots of the dot pattern included in the second image data is larger than the size of each of the dots of the dot pattern included in the first image data.

Therefore, it is possible to hide the dots of the base image 105 with the dots of the camouflage image 205 to effectively decrease the visibility of the base image 105 with the second image light.

System Configuration of Projection System 1B

Figure 9:
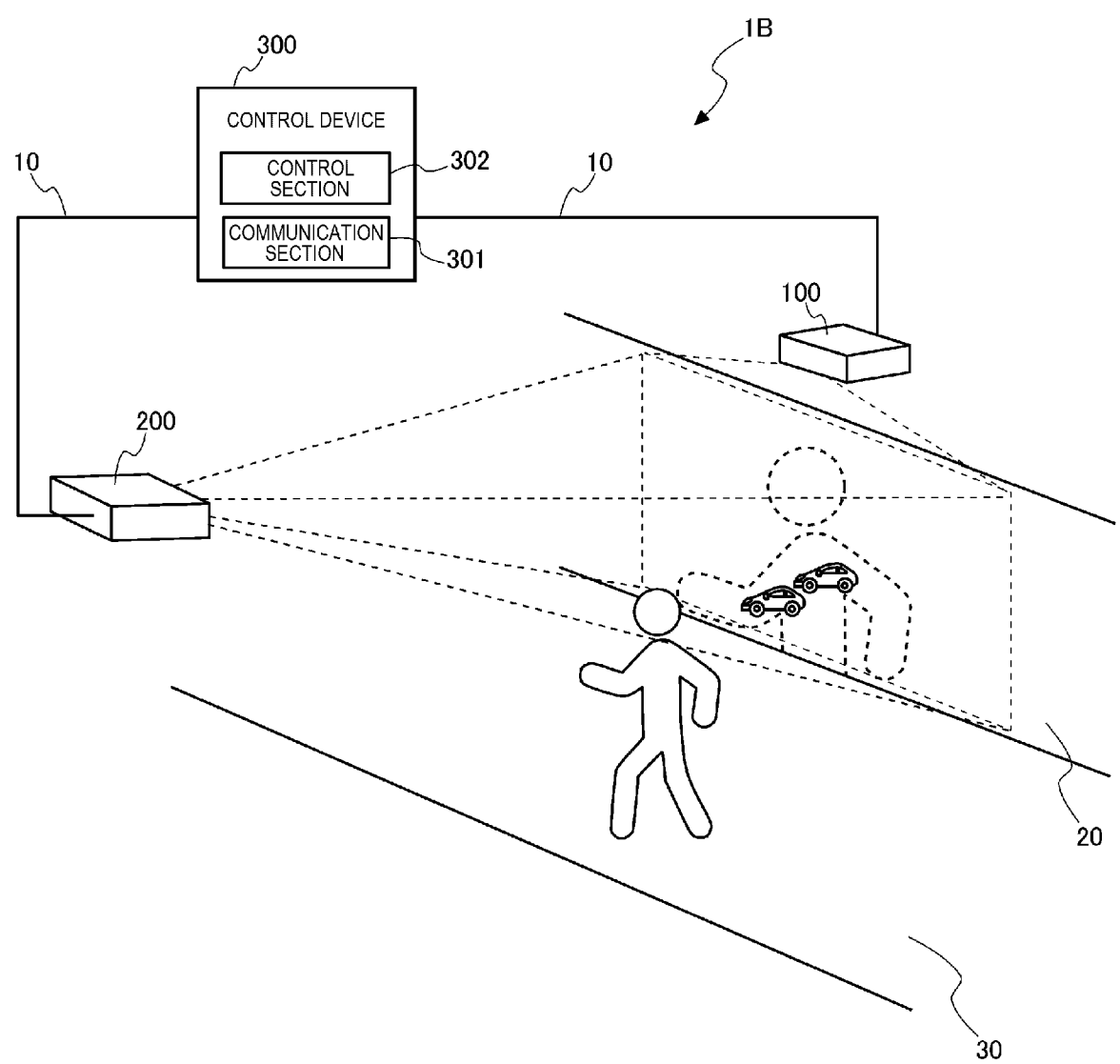
FIG. 9 is a system configuration diagram of another projection system.

In the present embodiment, there is adopted the configuration in which the first projector 100 or the second projector 200 operates as the master device to issue an instruction of the operation to the slave device, but it is also possible to adopt a system configuration of a projection system 1B provided with a control device 300 separately from the first projector 100 and the second projector 200 as shown in FIG. 9. The control device 300 is coupled to the first projector 100 and the second projector 200. The control device 300 is realized by a personal computer such as a laptop PC, or a tablet terminal. The control device 300 is provided with a communication section 301 for communicating with the first projector 100 and the second projector 200, and a control section 302 for controlling the control device 300.

Second Embodiment

Figure 10:
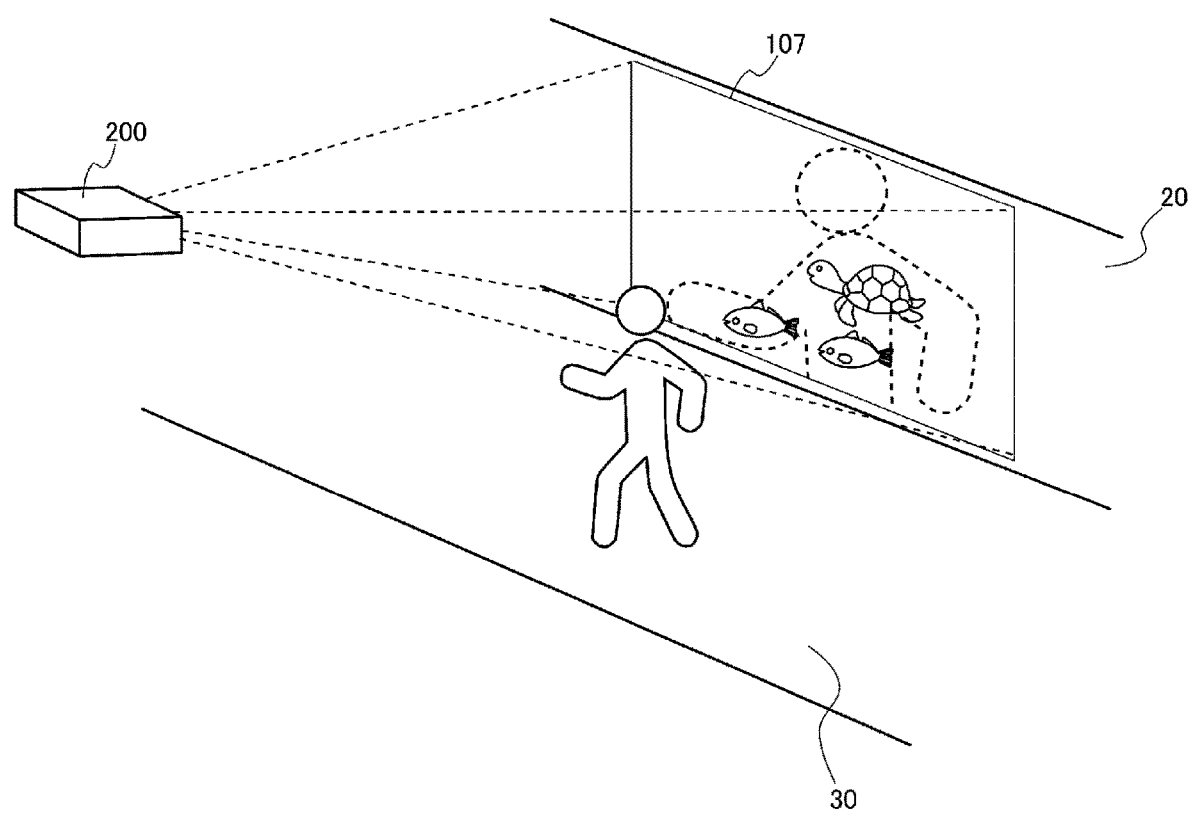
FIG. 10 is a configuration diagram showing a configuration of a second embodiment.

FIG. 10 is a configuration diagram showing a configuration of a second embodiment.

In the first embodiment, there is described when the base image 105 is formed on the projection surface 20 with the first image light projected by the first projector 100. In the second embodiment, the first projector 100 is not provided, and the base image 105 has a configuration in which a form 107 having an image printed thereon is attached on a wall surface as the projection surface 20.

The second projector 200 is installed on a wall surface opposed to the wall surface on which the base image 105 is attached across the passage way 30 similarly to the first embodiment. Further, the second projector 200 is adjusted to that the second image light projected by the second projector 200 is superimposed on the base image 105 attached to the wall surface. By the second projector 200 projecting the second image light on the base image 105, the visibility of the base image 105 is made lower than in the state in which the second image light is not projected on the projection surface 20.

In the base image 105 printed on the form 107, the image is formed of a dot pattern. Further, in the camouflage image 205 formed on the projection surface 20 by the second projector 200, the image is also formed of a dot pattern. The size of each of the dots of the dot pattern constituting the camouflage image 205 is larger than the size of each of the dots of the dot pattern forming the base image 105.

Thus, it is possible to effectively hide the dots of the base image 105 with the dots of the camouflage image 205 to effectively decrease the visibility of the base image 105.

As the second image data to be projected on the projection surface 20 by the second projector 200, the user operates the remote controller 5 to select the second image data corresponding to the tint and the luminance of the base image 105. The remote controller 5 functions as an "input section."

For example, it is possible to select the second image data having the same tint as the tint of the base image 105 as described above, or it is also possible to select the second image data including the same color as the color of the base image 105. Further, it is also possible to select the second image data having a lighter color, namely a color higher in intensity, than the color of the base image 105. Further, when proportion of the blue and yellow components to the color components included in the base image 105 are higher than those of other color components, it is also possible to select the second image data including a higher proportion of red and green components than other color components. Further, when six colors of red, green, blue, cyan, magenta and yellow are used in the base image 105, it is also possible to select the second image data using intermediate colors between the six colors of red, green, blue, cyan, magenta and yellow.

The control section 270 makes the image processing section 220 convert the second image data selected by the remote controller 5 into the image of the dot pattern. Further, the control section 270 makes the drive section 230 draw the image of the dot pattern thus converted in the drawing area 247 of the light modulation section 245 to thereby project the image of the dot pattern on the projection surface 20 as the second image light.

It is also possible to detect the luminance of the periphery of the projection surface 20 with the taken image of the imaging section 250, and then project the second image light corresponding to the luminance thus detected using the second projector 200. The imaging section 250 operates as a "detection section" for detecting the luminance.

The control section 270 calculates the luminance value based on the RGB values of the taken image, and then compares the luminance value thus calculated with a threshold value set in advance. When the luminance value thus calculated is higher than the threshold value, the control section 270 makes a change of increasing the luminance of the second image light projected by the second projector 200. Specifically, it is possible for the control section 270 to change the pixel values of the respective pixels constituting the second image data to increase the luminance of the second image light, or it is also possible to increase the intensity of the light emitted from the light source.

As described hereinabove, the second projector 200 according to the second embodiment is disposed so as to be opposed to the projection surface 20 on which the base image 105 is displayed. The second projector 200 is provided with the projection section 240 for projecting the second image light on the projection surface 20, and makes the visibility of the base image 105 on which the second image light is projected lower than in the state in which the second image light is not projected on the projection surface 20.

Therefore, it is possible to decrease the visibility of the base image 105 with the second image light. Further, since it is possible to provide the state in which the visibility of the base image 105 is not decreased by realizing the state in which the second image light is not projected on the projection surface 20, it becomes possible to visually recognize the base image 105. Therefore, since it is possible to hide the base image 105 with the second image light, or to show the base image 105 having been hidden, it is possible to entertain those looking at the base image 105, and to make the base image 105 attract a lot of attention.

Further, the second projector 200 is provided with the imaging section 250 operating as the detection section for detecting the luminance of the projection surface 20 in the state in which the second image light is not projected by the projection section 240.

In the second projector 200, the projection section 240 projects the image light corresponding to the luminance detected with the taken image of the imaging section 250.

Therefore, it is possible to decrease the visibility of the base image 105 with the second image light irrespective of the luminance of the projection surface 20.

Further, the second image light includes the color included in the base image 105.

Therefore, it is possible to effectively decrease the visibility of the base image 105 with the second image light.

Further, the second projector 200 is provided with the remote controller 5 and the remote control light receiving section 260 operating as the input section. The second projector 200 projects the second image light based on the input received by the remote control light receiving section 260.

For example, the user operates the remote controller 5 to select the image capable of decreasing the visibility of the base image 105. The second projector 200 generates the second image light based on the image thus selected. Thus, it is possible to effectively decrease the visibility of the base image 105 with the second image light.

The base image 105 is an image of a dot pattern in which the image is constituted by a plurality of dots. Further, the second projector 200 is provided with a light source, and the light modulation section 245, wherein the light modulation section 245 has the drawing area 247 in which an image can be drawn, and modulates the light emitted by the light source with the image drawn in the drawing area 247 to generate the image light.

The image drawn in the drawing area 247 is an image of a dot pattern. Further, the size of each of the dots of the dot pattern is larger than the size of each of the dots of the dot pattern included in the base image 105.

Therefore, it is possible to hide the dots of the base image 105 with the dots of the camouflage image 205 to effectively decrease the visibility of the base image 105 with the second image light.

Further, the projection section 240 projects the second image light higher in luminance than the base image 105 on the projection surface 20.

Therefore, it is possible to make the luminance of the projection surface 20 higher than in the state in which the second image light is not projected, and it is possible to effectively decrease the visibility of the base image 105 with the second image light.

Further, when four colors of red, green, blue and yellow are used as the colors of the image, there is a property that red and green seem strong. By using an image including a larger proportion of blue and yellow than other color components as the base image 105, and using the second image light including a larger proportion of red and green than other color components, it is possible to effectively decrease the visibility of the base image 105 with the second image light using this property.

The embodiments described above are each a preferred embodiment of the present disclosure. It should be noted that the present disclosure is not limited to the embodiment and the modified example, but can be implemented with a variety of modifications within the scope or the spirit of the present disclosure.

For example, in the second embodiment described above, the luminance of the periphery of the projection surface 20 is detected with the taken image of the imaging section 250, and then the second image light corresponding to the luminance thus detected is projected by the second projector 200. In the configuration of the first embodiment in which the first image light is projected by the first projector 100, and the second image light is projected by the second projector 200, it is also possible for the second projector 200 to detect the luminance of the periphery of the projection surface 20 with the taken image. The second projector 200 detects the luminance of the periphery of the projection surface 20 with the taken image of the imaging section 250, and then the second image light corresponding to the luminance thus detected is projected by the second projector 200.

Further, it is also possible for the image processing section 220 to perform the image processing of the second image data so that the dots included in the second image data are each disposed between the dots adjacent to each other included in the first image data.

For example, the control section 270 receives the first image data converted into the dot pattern from the first projector 100 as the image information. Further, it is also possible for the control section 270 to receive the first image data not having been converted into the dot pattern, and the dot size of the dot pattern to be converted into from the first projector 100 as the image information.

The control section 270 notifies the image processing section 220 of the dot size and the arrangement of the dots of the dot pattern into which the second image data is converted with reference to the first image data having been converted into the dot pattern. The image processing section 220 processes the second image data developed in the frame memory 225 to generate the second image data of the dot pattern by arranging the dots with the dot size notified of by the control section 270 at the positions notified of.

Further, when realizing the projection method according to the present disclosure with a computer provided to the second projector 200 or an external device coupled to the second projector 200, it is also possible to configure the projection method according to the present disclosure in the form of a program to be executed by the computer for realizing the method. Further, it is also possible to configure the projection method as an aspect of a recording medium storing the program in a computer-readable manner, or a transmission medium for transmitting the program.

Further, the processing units of the flowcharts shown in FIG. 7 and FIG. 8 are obtained by dividing the process of the control section 270 of the second projector 200 in accordance with major processing contents in order to make the process of the control section 270 easy to understand. The scope of the present disclosure is not limited by the way of the division or the names of the processing units shown in the flowcharts of FIG. 7 and FIG. 8. Further, the process of the control section 270 can also be divided into a larger number of processing units, or can also be divided so that one processing unit includes a larger amount of process in accordance with the processing contents. Further, the processing sequence of each of the flowcharts described above is not limited to the illustrated examples.

Further, the programs to be executed by the processors 173, 273 can also be stored in a storage device, a storage medium or the like configured as a separate body from the first projector 100 or the second projector 200 besides the memories 171, 271. Further, it is possible to adopt a configuration in which the processors 173, 273 obtain and then execute the programs stored in an external device.

What is claimed is:

1. A projector comprising:
a projection section configured to project image light on a projection surface on which a base image is displayed, the projection section projecting the image light to increase light intensity on the projection surface while decreasing visibility of the base image;
a light source; and
a light modulation section having a drawing area in which an image is drawn, and configured to modulate light emitted from the light source with the image drawn in the drawing area to generate the image light, wherein
the image drawn in the drawing area includes an image constituted by a diagram,
a size of the diagram is larger than a size of a diagram included in the base image,
visibility of the base image on which the image light is projected is made lower than in a state in which the image light is not projected on the projection surface, and
when the image light is blocked from a portion of the projection surface while not blocked from the remaining portions of the projection surface, the visibility of the base image in the portion is higher than the visibility of the base image in the remaining portion.

2. The projector according to claim 1, further comprising:
a detection section configured to detect luminance of the projection surface in the state in which the image light is not projected by the projection section, wherein
the projection section projects the image light corresponding to the luminance detected by the detection section.

3. The projector according to claim 1, further comprising:
an input section, wherein
the projection section projects the image light based on an input received by the input section.

4. The projector according to claim 1, wherein
the image light corresponds to a camouflage image configured to camouflage the base image.

5. The projector according to claim 1, wherein
the projection section projects the image light higher in luminance than the base image on the projection surface.

6. The projector according to claim 1, wherein
the base image is an image including a larger proportion of blue component and yellow component than another color component, and
the image light includes a larger proportion of red component and green component than another color component.

7. The projector according to claim 1, further comprising:
an image information input section configured to input information related to a color component of the base image; and
a control section configured to change a color component included in the image light to be projected by the projection section based on the information input to the image information input section, wherein
the base image is an image projected by another projector configured to project image light corresponding to the base image.

8. A projection system comprising:
a first projector configured to project first image light on a projection surface; and
a second projector installed at a same side as the first projector with respect to the projection surface at a position farther from the projection surface than the first projector, and configured to project second image light to the projection surface, wherein
the second projector projects the second image light so as to make visibility of an image formed on the projection surface by the first image light lower than in a state in which the second image light is not projected on the projection surface.

9. The projection system according to claim 8, wherein
the second projector is disposed at a position where the second projector forms a space to be a passage way with the first projector.

10. The projection system according to claim 8, wherein
the second image light includes light configured to make luminance of the image formed on the projection surface by the first image light higher than in the state in which the second image light is not projected on the projection surface.

11. The projection system according to claim 8, wherein
an image formed on the projection surface by the second image light is a camouflage image configured to camouflage the image formed on the projection surface by the first image light.

12. The projection system according to claim 8, further comprising:
an image information input section configured to input information related to the first image light to be projected by the first projector; and
a control section configured to control the second image light to be projected by the second projector based on the information input to the image information input section.

13. The projection system according to claim 12, wherein
the first projector projects the first image light based on first image data,
the second projector projects the second image light based on second image data,
the image information input section inputs information related to a color component of the first image data, and
the control section selects the second image data based on the information input to the image information input section, and makes the second projector project the second image light based on the second image data selected.

14. The projection system according to claim 13, wherein
when the information related to the color component of the first image data input to the image information input section is information representing a blue component and a yellow component, the control section generates the second image data including a larger proportion of red component and green component than another color component.

15. The projection system according to claim 8, wherein
the first projector projects the first image light based on first image data,
the second projector projects the second image light based on second image data,
the first image data and the second image data are data of an image constituted by a diagram, and
a size of the diagram included in the second image data is larger than a size of the diagram included in the first image data.

16. A projection method comprising:
projecting image light on a projection surface by a projector disposed so as to be opposed to the projection surface on which a base image is displayed to increase light intensity on the projection surface while decreasing visibility of the base image and to make visibility of the base image on which the image light is projected lower than in a state in which the image light is not projected on the projection surface;

providing a drawing area in which an image is drawn, and modulating light emitted from a light source with the image drawn in the drawing area to generate the image light; and when the image light is blocked from a portion of the projection surface while not blocked from the remaining portions of the projection surface, making the visibility of the base image in the portion higher than the visibility of the base image in the remaining portion, wherein the image drawn in the drawing area includes an image constituted by a diagram, and a size of the diagram is larger than a size of a diagram included in the base image.

17. A projection method comprising: according to claim 16, wherein the base image is an image projected by another projector configured to project image light corresponding to the base image.

\* \* \* \* \*